(12) United States Patent
Krutsch et al.

(10) Patent No.: US 10,425,314 B2
(45) Date of Patent: Sep. 24, 2019

(54) BANDWIDTH ESTIMATION CIRCUIT, COMPUTER SYSTEM, METHOD FOR ESTIMATING AND PREDICTING THE BANDWIDTH AND COMPUTER READABLE PROGRAM PRODUCT

(71) Applicant: FREESCALE SEMICONDUCTOR, INC., Austin, TX (US)

(72) Inventors: Robert Cristian Krutsch, Munich (DE); Valentin-Adrian Gancev, Munich (DE)

(73) Assignee: NXP USA, Inc., Austin, TX (US)

( * ) Notice: Subject to any disclaimer, the term of this patent is extended or adjusted under 35 U.S.C. 154(b) by 465 days.

(21) Appl. No.: 15/039,093

(22) PCT Filed: Dec. 5, 2013

(86) PCT No.: PCT/IB2013/060660
§ 371 (c)(1),
(2) Date: May 25, 2016

(87) PCT Pub. No.: WO2015/082959
PCT Pub. Date: Jun. 11, 2015

(65) Prior Publication Data
US 2017/0026266 A1  Jan. 26, 2017

(51) Int. Cl.
*G06F 17/50* (2006.01)
*G06F 11/00* (2006.01)
(Continued)

(52) U.S. Cl.
CPC ........ *H04L 43/0888* (2013.01); *G06F 11/348* (2013.01); *G06F 11/3409* (2013.01);
(Continued)

(58) Field of Classification Search
USPC ............... 703/2, 18, 19; 356/73.1; 455/41.2; 330/127
See application file for complete search history.

(56) References Cited

U.S. PATENT DOCUMENTS

| | | | |
|---|---|---|---|
| 4,901,082 A * | 2/1990 | Schreiber | G01S 7/28 342/162 |
| 7,684,046 B2 * | 3/2010 | Rafac | G01J 3/02 356/454 |

(Continued)

OTHER PUBLICATIONS

Ding et al., "Bandwidth-Based Performance Tuning and Prediction," Proceedings of the IASTED International Conference, Parallel and Distributed Computing and Systems, Nov. 3-6, 1999, 7 pages.

(Continued)

*Primary Examiner* — Thai Q Phan (57) ABSTRACT

The present invention relates to a bandwidth estimation circuit for estimating and predicting the bandwidth of a computer system, the bandwidth estimation circuit comprising: a memory unit which is configured to store multiple predetermined bandwidth envelopes, wherein each one of the predetermined bandwidth envelopes is assigned to a feature of a code of an application program; a bandwidth measurement unit which is configured to online measure the bandwidth of a data transaction based on the code; a selection unit coupled either to the memory unit and the bandwidth measurement unit and configured to find the nearest bandwidth envelopes in the memory unit for the measured bandwidth; a calculation unit which is configured to calculate a ratio between the selected bandwidth envelopes, to construct a new bandwidth envelope by applying an interpolation function based on the calculated ratio and to calculate an estimated bandwidth by applying the new bandwidth envelope. The present invention also relates to a (Continued)

computer system, a method for estimating and predicting the bandwidth and a computer readable program product.

16 Claims, 6 Drawing Sheets

(51) Int. Cl.
H04L 12/26 (2006.01)
G06F 11/34 (2006.01)
H04L 12/24 (2006.01)
H04L 29/08 (2006.01)

(52) U.S. Cl.
CPC ........ *H04L 41/147* (2013.01); *H04L 43/0817* (2013.01); *H04L 67/025* (2013.01); *G06F 2201/805* (2013.01); *G06F 2201/865* (2013.01); *G06F 2201/87* (2013.01); *H04L 43/0876* (2013.01)

(56) References Cited

U.S. PATENT DOCUMENTS

| | | | | |
|---|---|---|---|---|
| 7,737,731 | B1* | 6/2010 | Luo | G01R 19/04 327/58 |
| 8,271,223 | B2* | 9/2012 | Rawlins | H03F 1/0211 702/90 |
| 8,599,690 | B2 | 12/2013 | Kang et al. | |
| 8,614,592 | B1* | 12/2013 | Luo | G01R 19/04 327/58 |
| 8,964,998 | B1* | 2/2015 | McClain | H03G 3/32 381/106 |
| 9,084,559 | B2* | 7/2015 | Sumi | A61B 8/08 |
| 2002/0093643 | A1* | 7/2002 | Moeller | G01M 11/336 356/73.1 |
| 2004/0073735 | A1 | 4/2004 | Boom et al. | |
| 2004/0263861 | A1* | 12/2004 | Rafac | G01J 1/4257 356/519 |
| 2005/0031341 | A1* | 2/2005 | Stuart | H04B 10/2575 398/26 |
| 2012/0212293 | A1* | 8/2012 | Khlat | H03F 1/0227 330/127 |
| 2012/0238210 | A1* | 9/2012 | Duron | H04B 17/14 455/41.2 |
| 2013/0160016 | A1 | 6/2013 | Gummaraju et al. | |
| 2013/0254767 | A1 | 9/2013 | Mizuno et al. | |
| 2013/0297919 | A1 | 11/2013 | Kang et al. | |

OTHER PUBLICATIONS

Tikir et al., "A Genetic Algorithms Approach to Modeling the Performance of Memory-bound Computations," SC07 Nov. 10-16, 2007, Reno, Nevada, 12 pages.

Boyer, Michael, "Improving GPU Performance Prediction with Data Transfer Modeling," 2013 IEEE 27th International Symposium on Parallel & Distributed Processing Workshops and PhD Forum, 10 pages.

Resios et al., "GPU performance prediction using parametrized models," Thesis from Utrecht University, Aug. 2011, 66 pages.

Zhang et al., "A Quantitative Performance Analysis Model for GPU Architectures," 2011 IEEE 17th International Symposium on High Performance Computer Architecture, Feb. 2011, 12 pages.

International Search Report for application PCT/IB2013/060660, dated Sep. 2, 2014, 13 pages.

* cited by examiner

BANDWIDTH ESTIMATION CIRCUIT, COMPUTER SYSTEM, METHOD FOR ESTIMATING AND PREDICTING THE BANDWIDTH AND COMPUTER READABLE PROGRAM PRODUCT

FIELD OF THE INVENTION

The present invention relates to a bandwidth estimation circuit. The present invention also relates to a computer system, a method for estimating and predicting the bandwidth and a computer readable program product.

BACKGROUND OF THE INVENTION

Modern computer systems are getting more and more complex due to the general trend that different applications are integrated into one and the same computer system. For example, in the automotive industry the amount of electronic systems within a vehicle has steadily increased in recent years. Typically, such computer systems comprise microcontrollers each having a central processing unit (CPU) which runs applications. In case of video applications which may be part of complex multi-media infotainment systems, navigation systems and instrument cluster systems, a graphics processing unit (GPU) is typically used to provide processing capability required for real-time graphics. The present invention and its underlying problem will hereinafter be described on the basis of a computer system which comprises such a GPU for processing graphics data, however, without restricting the invention to such application and computer system.

In order to provide better interaction between different applications providing graphics information to a user and in order to reduce circuitry resources the trend in the automotive industry goes towards computer systems with microcontrollers and GPUs, respectively allowing to perform multiple separate application programs thereon at the same time, i.e. multitasking computer systems. In this scenario where multiple applications in a multi tasking environment run on a computer system, already one resource demanding application may unduly delay the execution of the other applications running on the computer system. In particular, in case one or more safety critical applications are run on the computer system, unduly delays thereof are unacceptable. On contrary, the timely execution of safety critical applications has to be guaranteed, wherein the term timely execution should be understood as execution at a predetermined moment in time or within a predetermined time window. In order to ensure timely execution, the execution of one or more applications run on the computer system may be prioritized over the other applications.

Hence, in much safety critical applications it is necessary to estimate the worst case operation time for specific application programs or at least predict the run-time behaviour of such application programs. Major factors, which affect the run-time behaviour of an application, are instruction execution time at the processing unit and the time to provide the input data at the processing unit and to save the processing results. The latter time is inter alia dependent on the amount of data to be communicated between memory and processing unit and the data throughput capacity of the medium, the data bus infrastructure, used to communicate the data between them.

In case of static allocation of system resources, profiling based approaches can be employed. However, for computer systems which are operated as an open platform where different software applications and tools are executable, in particular from different software providers, this is a not a trivial approach. The actual set of applications executed substantially simultaneously may change at any time and is unknown or at least not completely defined at the time of development of such computer systems. Referring back to the aforementioned example, such a use case can become reality when consolidating the cars instrument cluster and infotainment systems into one single system, which e.g. allows a user for installing software application to enhance the infotainment functionality. Since the instrument cluster being the most demanding and security critical module, it needs to have priority access to the GPU, in particular in a timely manner and with a level of determinism. To be able to guarantee the number of frames per second required by the core component of this instrument cluster, one has to estimate the required run-time duration of the other modules accessing the same GPU substantially at the same time.

Estimating the runtime of an application or a part thereof that runs on the GPU implies typically the evaluation of the bandwidth required for data transaction or the cycle count spent in executing GPU instructions. The present invention addresses an approach based on an estimation of the impact of the bandwidth on the run-time behaviour of an application since this value is expected to be one of the major factors determining the time consumption since graphics processing is typically data-demanding.

There are various possibilities described in the art which are dealing with bandwidth prediction (or bandwidth estimation). One approach for bandwidth prediction is described in the thesis "GPU performance prediction using parameterized models", from Andreas Resios, Utrecht University, August 2011, (Supervisor at Utrecht University: Prof. Dr. S. Doaitse Swierstra), ICA-3426874. In this thesis it is proposed to estimate the bandwidth of the GPU by using a linear curve which should approximate an envelope function of the bandwidth. However, according to this approach, no feedback of the bandwidth estimation is given. Further, no different curves are used for the impact of different instructions, such as read or write, to the behavior on the bandwidth. Further, no multiple envelopes are used, even though different instructions to access the memory, such as load or store, heavily influence the bandwidth prediction in a different manner. Therefore, the bandwidth prediction as described in the above thesis is not suitable especially for those codes which comprise many different instructions. This is in particular an issue for safety critical modules operated by the microprocessor. In particular, then it is not possible to provide a reliable bandwidth estimation under scenarios where multiple applications are operated simultaneously on the processing system.

Consequently, there is a need to find a reliable possibility to estimate the runtime behaviour of different applications which run on the same processing unit by estimating the data transaction bandwidth required by the applications executed by the processing unit.

SUMMARY OF THE INVENTION

The present invention provides a bandwidth estimation circuit, a computer system, a method for estimating and predicting the bandwidth and a computer readable program product as described in the accompanying independent claims.

Specifically, according to a first aspect of the invention, a bandwidth estimation circuit for estimating the data transaction bandwidth of application programs executed on a computer system is provided, the bandwidth estimation circuit comprising: a memory unit which is configured to store multiple predetermined bandwidth envelopes, wherein each one of the predetermined bandwidth envelopes is assigned to a feature of a code section of one of the application programs; a bandwidth measurement unit which is configured to online measure the bandwidth of a data transaction or communication effected by the code or resulting from the code execution; a selection unit coupled to the memory unit and the bandwidth measurement unit and configured to find the nearest bandwidth envelopes in the memory unit for the measured bandwidth; a calculation unit which is configured to calculate a ratio between the selected bandwidth envelopes, to construct a new bandwidth envelope by applying an interpolation function based on the calculated ratio and to calculate an estimated bandwidth by applying the new bandwidth envelope.

According to a second aspect of the invention, a computer system, in particular an automotive video computer system, is provided, comprising: a programmable circuit which is configured to run at least one different application program; a bandwidth estimation circuit according to the first aspect of the invention which is connected to the programmable circuit via a loop back connection in order to enable the bandwidth measurement unit to online measure the bandwidth of a data transaction and data communication when one or more application programs are executed by the programmable circuit and a code of one of the application programs is executed by the programmable circuit, respectively.

Further, according to a third aspect of the invention, a method for estimating and predicting the bandwidth, in particular by applying a bandwidth estimation circuit according to the first aspect of the invention, is provided, the method comprising: a first operation mode where the bandwidth is estimated offline by analysing an application program, detecting the features therein and estimating the bandwidth by using predetermined bandwidth envelopes for each one of the detected features; a second operation mode where the bandwidth is estimated online based on iteratively measuring the bandwidth of a communication, providing an interpolating function which fits best to the measured bandwidth and calculating the bandwidth using the interpolation function.

Finally, according to a fourth aspect of the invention, a computer readable program product, comprises instructions which, when executed on a computer, cause the computer to perform a method according to the third aspect of the invention.

It is a finding of the present invention that one of the main factors that affect the runtime of a computer system which in particular has to execute different (video) application programs is the bandwidth. It can be further observed that the bandwidth of the processing unit of the computer system is mainly influenced by the overall amount of data that needs to be transferred and by the instruction types that are used.

Based on the capability to measure the bandwidth consumed by a data transaction through the data such as the central processing unit and to be able to synchronize bandwidth measurements with the moment when the processing unit executes a code of an application program effecting data transaction, the present application proposes an approach that is able to estimate the bandwidth by starting from an initial estimation and then refining and optimizing this initial estimation through a close loop approach on the basis of the bandwidth measurements. An aspect of the present invention is to provide—for the initial bandwidth estimation—a table having different bandwidth envelopes for different instruction types, wherein it should be understood that types of instruction relate to data handling such as read, write, load, store (also referred to as type of handling) and further to size of the data entities such as 32 bit, 64 bit, 128 bit and further to data entities such as atomic data entities or vector or array data entities, i.e. set of several data entities interpreted to be organized in a predetermined arrangement (also denoted as type of data entities), etc. These bandwidth envelopes which are stored in a memory are constructed of segments, in particular linear segments, which are preferably interconnected and which are found to show a good approximation of the corresponding bandwidth. For an online mode, then the current bandwidth is measured and a new bandwidth envelope is constructed based on the calculation of the ratio between the two nearest bandwidth envelopes stored in the memory. This new bandwidth envelope, which is preferably also constructed of segments, in particular linear segments, may then be used for the estimation of the actual bandwidth of the computer system.

It should be further understood that the bandwidth of a data transaction may be a function of the amount of data transferred during the data transaction. Moreover, the bandwidth may be a function of the one or more instructions effecting the data transaction such as type of handling, size of data, type of the data entities and the like as aforementioned. Further, it should be noted that the time required by a data transaction may be calculated or at least estimated by considering the bandwidth for a data transaction and the amount of data transferred during this data transaction.

The method according to aspects of this invention is in particular suited to improve the worst time execution time estimation and prediction, respectively, to improve load balancing and to improve bandwidth based scheduling.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

In all figures of the drawings elements, features and signals which are the same or at least have the same functionality have been provided with the same reference symbols, unless explicitly stated otherwise.

DETAILED DESCRIPTION OF THE EMBODIMENTS

Figure 1:
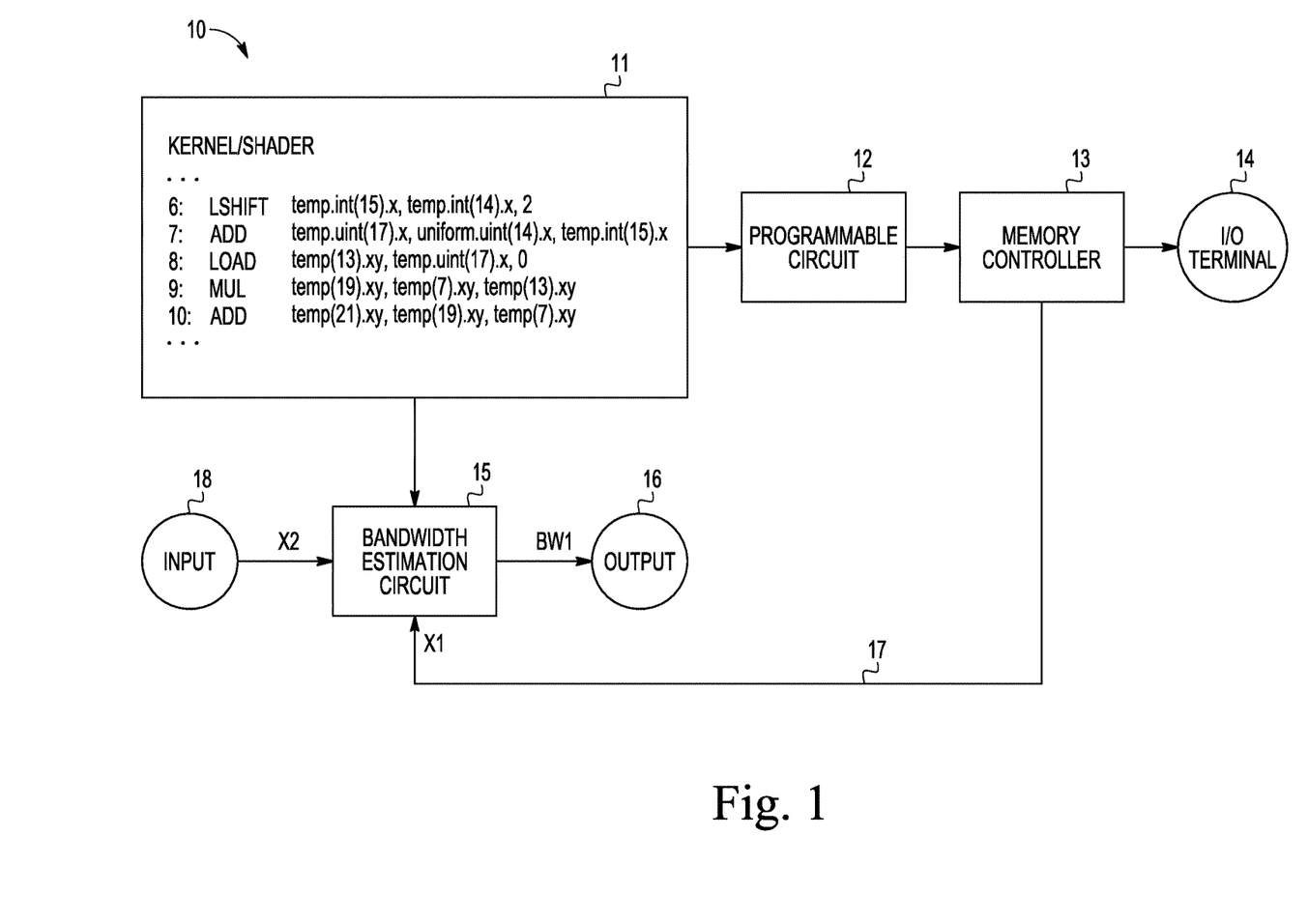
FIG. 1 schematically shows an exemplary block diagram of a computer system having a bandwidth estimation circuit according to an embodiment of the invention.

FIG. 1 schematically shows an exemplary block diagram of a computer system according to an embodiment of the invention. The computer system which is denoted by reference sign 10 may be an automotive audio/video computer system 10. The computer system 10, which may be any kind of a communication system, comprises a code memory 11, a programmable circuit 12 and a memory controller 13.

The code memory 11 may be a program memory which is configured to store at least one program, such as an application program, or code, code sections or kernels thereof. The code memory 11 is operatively coupled to the programmable circuit 12 which is configured to process or execute at least a part of the application program, cod sections or kernels stored in the code memory 11. For this, the programmable circuit 12 comprises a processing unit. The programmable circuit 12 is preferably a graphics processing unit in case the application program comprises graphics data to be processed. A graphics processing unit or GPU may comprise several stream processors for parallel computation of graphics data. A memory controller 13 is arranged downstream the programmable circuit 12, which is configured to manages the flow of data going from the programmable circuit 12 to a data memory (not shown) and from the data memory (not shown) to the programmable circuit 12. Such memory controller 13 may be configured to drive and interface with one or more memory units supporting one or more data transfer protocols and interconnection infrastructure. Today's graphic processing units include for instance so-called DDRx memory controllers, which are configured to interface with and drive DDRx RAM, which stands for double data rate type x random access memory and x indicates the version 1, 2, 3 or 4, where data is transferred with a integer multiple of a clock signal. The memory controller 13 receives data from and provides processed data to the input/output terminal 14 operatively connected to a data memory (not shown). It should be understood that the aforementioned code memory 11 and the data memory may be distinct memories or may be part of a common memory architecture.

The computer system 10 further comprises a bandwidth estimation circuit 15. The bandwidth estimation circuit 15 is configured to predict or estimate the bandwidth of one or more application programs or at least parts thereof executed simultaneously at the computer system 10 and to provide at an output 16 an information BW1 of the predicted bandwidth.

The bandwidth estimation circuit 15 is connected to the code memory 11. The bandwidth estimation circuit 15 is further connected to the memory controller 13 via a loop back connection 17 in order to enable the estimation circuit 15 to online measure the bandwidth of data transfers handled by the memory controller 13 when one or more application programs are executed by the programmable circuit 12. The bandwidth estimation circuit 15 is further connected to input 18 which provides information 18 comprising e.g. information about the mode of operation of the bandwidth estimation circuit 15, information about a memory size for data provided e.g. by the driver enabling access to the programmable circuit 12 and its supporting components such as the memory controller 13, information about buffers for temporarily storing data and the like.

Figure 2:
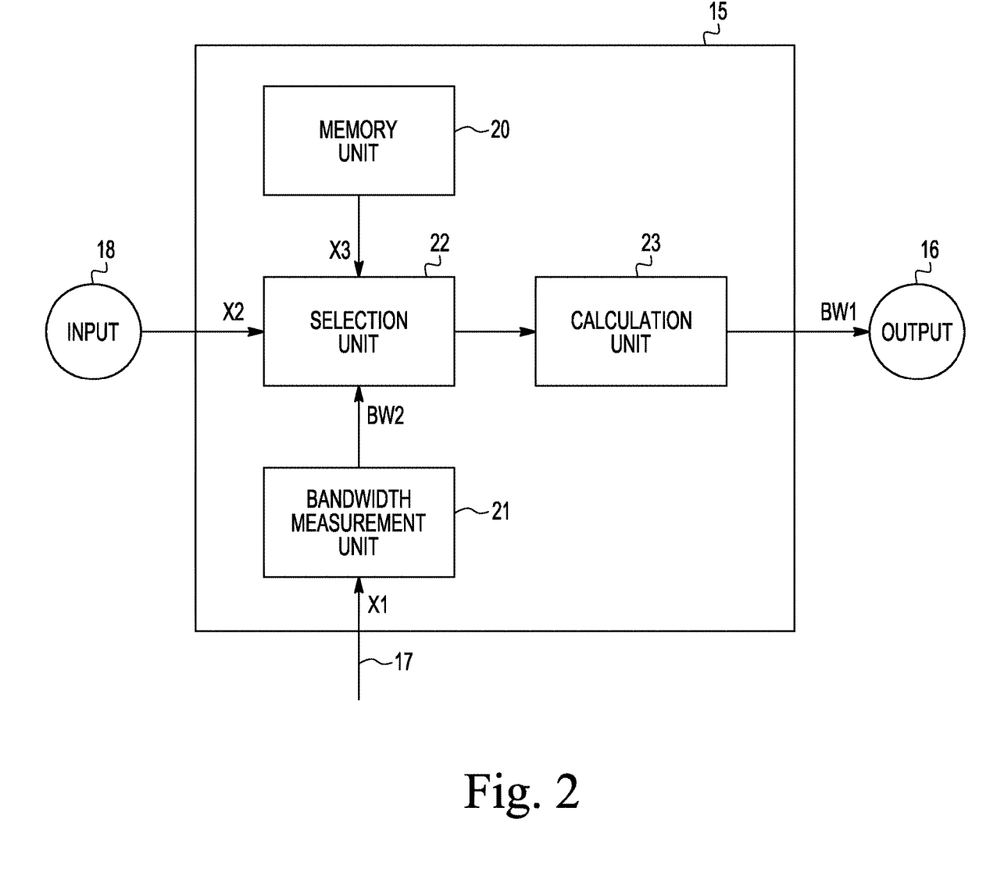
FIG. 2 schematically shows a block diagram of the bandwidth estimation circuit according to an embodiment of the invention.

Hereinafter, a first embodiment of the bandwidth predicting circuit 15 is described using the block diagram of FIG. 2. This bandwidth estimation circuit 15 comprises a memory unit 20, a bandwidth measurement unit 21, a selection unit 22 and a calculation unit 23.

The memory unit 20 is configured to store multiple predetermined bandwidth envelopes. Each one of the predetermined bandwidth envelopes is associated to a feature of an application program, or code sections, code fragments or code kernels thereof, which feature relates to, involves and/or effects data transfer. The retrieving, gathering and determining of the predetermined bandwidth envelopes will be described in more detail later.

The bandwidth measurement unit 21 is configured to online measure the bandwidth of data transfer X1 provided to the bandwidth measurement unit 21 via the loop back connection 17. The measurement of the bandwidth relates to at least one of different features and codes relating to, involving and/or effecting transfer of data and is in particular synchronized with the execution of the respective feature.

The selection unit 22 is coupled on the one hand side to the memory unit 20 and the other hand side to the bandwidth measurement unit 21. The selection unit 22 is analysing the measured bandwidth BW2 provided by the bandwidth measurement unit 21. The selection unit 22 is further configured to find the nearest bandwidth envelopes X3 stored in the memory unit 20 for a current measured bandwidth BW2. Typically, but not necessarily, the two nearest bandwidth envelopes are selected by comparing a difference of the measured bandwidth BW2 with all or at least some of the stored bandwidth envelopes and by selecting those stored bandwidth envelopes which exhibit the lowest differences.

The calculation unit 23 is configured to calculate a ratio between the two selected bandwidth envelopes X3. Based on the calculated ratio, the calculation unit 23 constructs a new bandwidth envelope by applying an interpolation function. This interpolation function is typically a linear function. Finally, the calculation unit 23 calculates the estimated bandwidth BW1 by applying the newly constructed bandwidth envelope.

Hereinafter, a second embodiment of the bandwidth estimation circuit 15 is described by means of the block diagram in FIG. 3. Additional to the circuitry elements as shown in FIG. 2, the bandwidth estimation circuit 15 according to FIG. 3 further comprises a detection unit 24, such as a compiler. The detection unit 24 is arranged between the code memory 11 of the computer system 10 and the selection unit 22. This detection unit 24 is operated in an offline mode, i.e. before the regular bandwidth estimation as described above with regard to FIG. 2 is started. In this offline mode the detection unit 24 is configured to analyse at least a code or a kernel of an application program stored in the code memory 11 and to detect one or more data transaction features in the code and kernel, respectively. In this regard, a feature, which may be also designated as data transaction feature, may be understood to refer an instruction of the code or kernel relating to, involving and/or effecting data transfer, such as a write instruction, read instruction, load instruction and/or store instruction. Likewise, a feature may be understood to refer to one of a code (as a whole), a kernel (as a whole), a program loop, a set of preferably subsequent instructions, one or more commands and the like relating to, involving and/or effecting data transfer. In the offline mode the selection unit 22 is configured to select one of the bandwidth envelopes stored in the memory unit 20 in accordance with the detected feature; i.e. the selected bandwidth envelope out of the predetermined bandwidth envelopes provided in the memo unit 20 is associated to a feature, which matches to or is a least similar to the detected feature. Then, the calculation unit 23 is configured to determine an estimated bandwidth by applying the selected bandwidth envelope.

Figure 3:
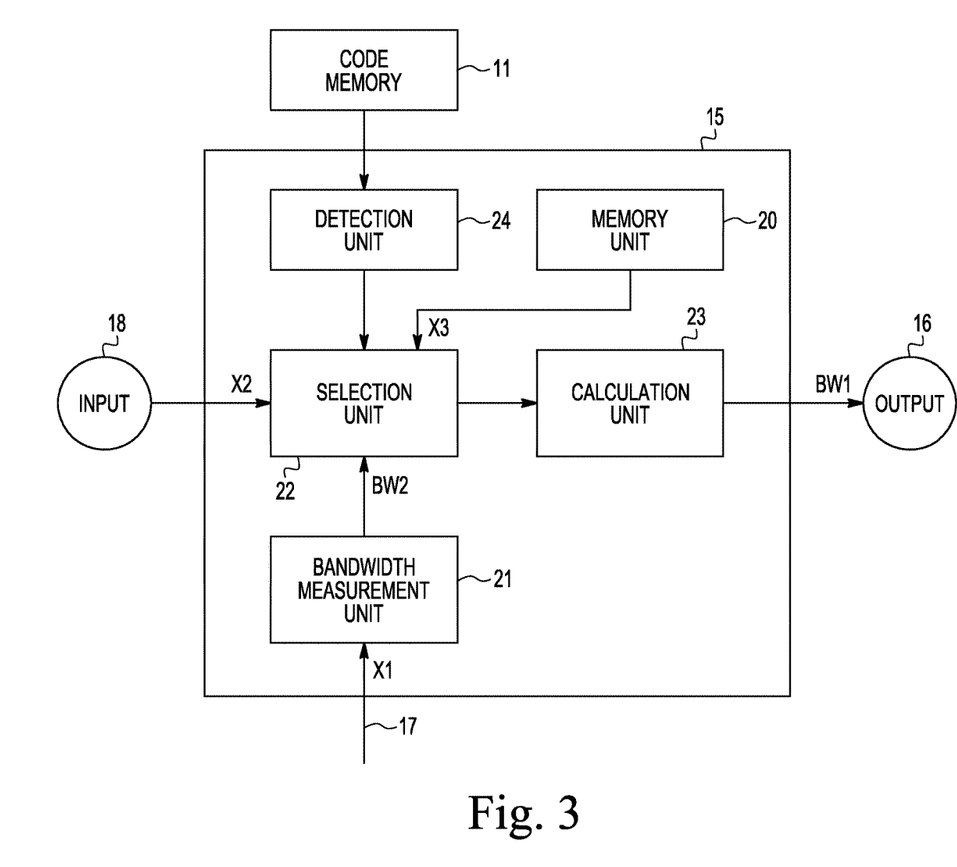
FIG. 3 schematically shows a block diagram of the bandwidth estimation circuit according to a further embodiment of the invention.

Typically, the selection unit 24 and/or the calculation unit 23 may be part of a programmable apparatus (not shown in FIG. 3).

Hereinafter, the method of estimating and predicting the bandwidth by applying a bandwidth estimation circuit 15 is described in more detail. The method according an embodiment of the present invention may be understood to comprise two stages:

An initial estimate stage where in an offline mode an initial bandwidth is computed based on the code to be executed on the programmable circuit 12 and on predetermined bandwidth envelopes. This is preferably performed in offline mode since it may need significant computation effort due to the fact that all code and instructions thereof have to be parsed and analyzed under various circumstances.

The runtime estimate stage, where in an online mode actual bandwidth measurements are performed. According to an embodiment of the present invention, the bandwidth estimation at runtime may be optimized by using the bandwidth measurements available through the loop back connection 17, in particular by adapting the predetermined bandwidth envelopes on the basis of the bandwidth measurements.

Figure 4:
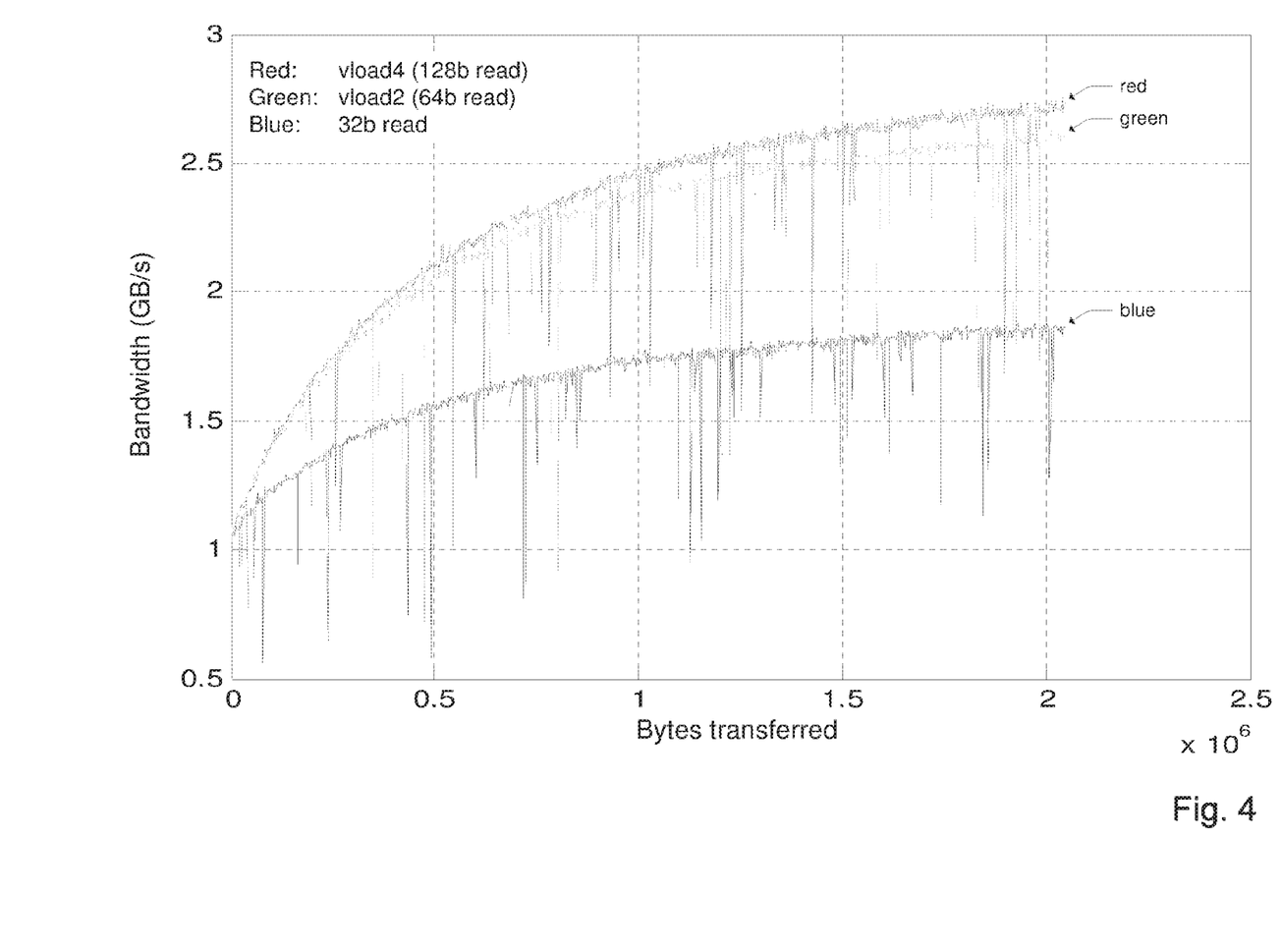
FIG. 4 shows an example of bandwidth curves measured for different "read"-instruction types as a function of the amount of data of the type of the respectively effected data transaction.

First, the kernel or code that is to be executed on the programmable circuit 12 is analyzed in an offline mode and the instructions relating to data transfers, such as the read, write, load, or store instructions, which are used in the kernel or code, are detected. The size of the data to be handled by the instructions and/or the sizes of the used buffers of the computer system 10 can be determined for example by using application programming interface (APIs) like OpenGL and OpenCL, which abstract interaction with a Graphics processing units (GPUs). This information is provided to the selection unit 22. The selection unit 22 is then performing a mapping of what type of instruction is used for what data amount or buffer. In this calibration or offline mode the bandwidth envelopes for different features, such as read, write, store, load instructions, are computed. An example depicting different bandwidth envelopes for different types of instruction, i.e. instructions relating to different data transfer operations, e.g. for read instructions within an application program or a code thereof, which are transferred with a bit width of 128 bit, 64 bit and 32 bit, is shown in FIG. 4. "Vload4 (128)" refers to an instruction to read a vector value from the memory, which has 4 elements, each of which has a size of 128 bit, "vload2" refers to an instruction to read a vector value from the memory, which has 2 elements, each of which has a size of 64 bit, and "32b" refers to an instruction to read a 32 bit value from the memory.

Figure 5:
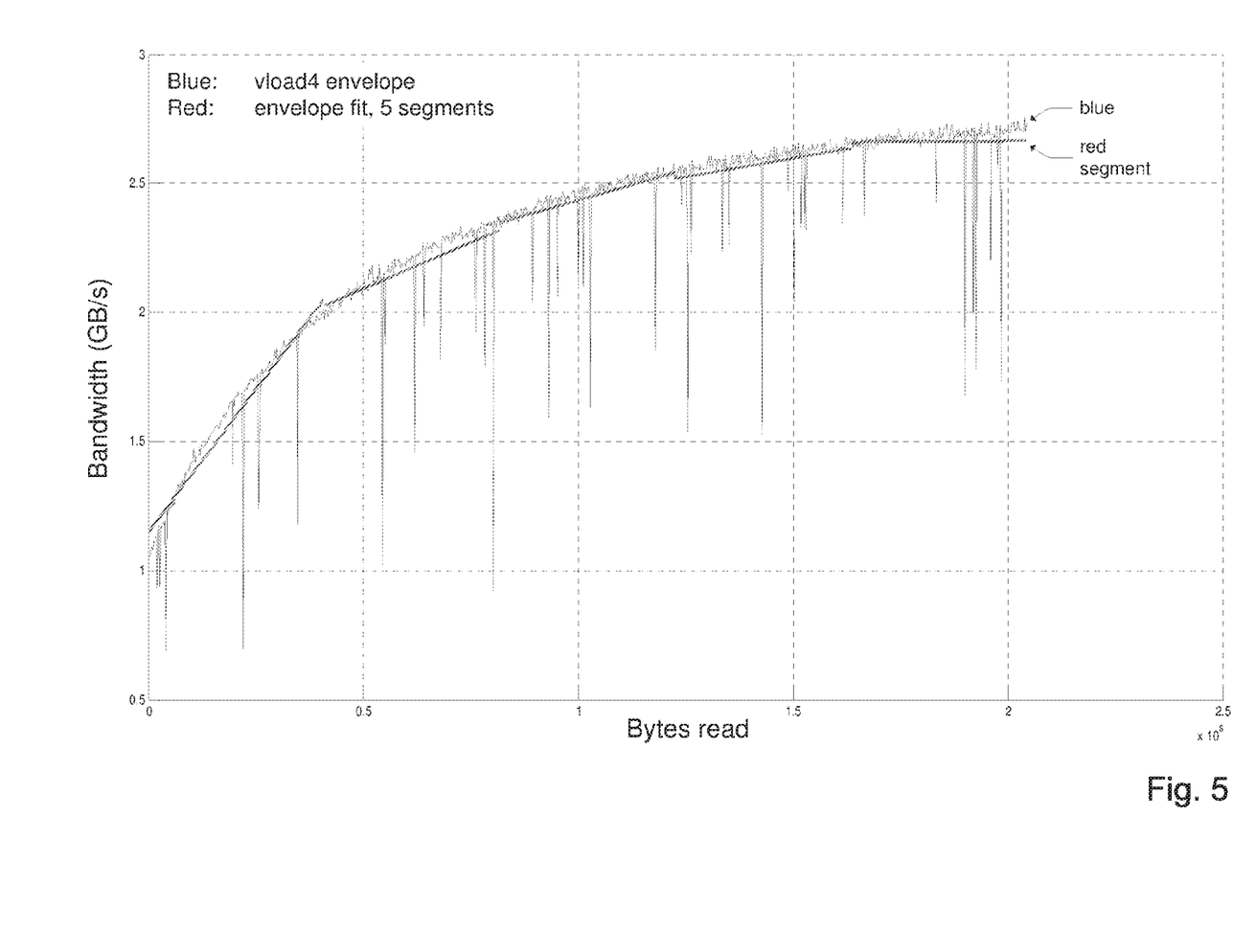
FIG. 5 shows a bandwidth curve approximated with segments.

According to an embodiment of the present invention, the bandwidth envelopes be stored and used for further calculation are approximated by a piecewise function including one or more segments as shown in FIG. 5. The different segments are preferably represented by linear functions, hence each of the bandwidth envelopes may be approximated by a piecewise linear function. This way an approximation of the bandwidth envelope is generated which is formed of multiple interconnected segments. Such an approximated bandwidth envelope curve does not require much memory resources and may then be easily stored in the memory unit 20 holding a table of approximated bandwidth envelopes. Since the approximated bandwidth envelope curve is composed of linear segments it does not need much computing capacity and thus is better manageable for bandwidth estimation. The segments of the approximated bandwidth envelope may be stored in and provided by the memory on the basis of a parameterized representation of the segments, i.e. a functional representation of the segments in parametric form.

The initial estimated bandwidth envelope may be a proportional summation based on the bandwidth envelopes and on the different instructions and instruction types, respectively. According to an embodiment of the present invention, a feature may comprise such different instructions or different instruction types, respectively. For example, in a simple case where two vectors of equal length (number of vector elements) for a read instruction are given, one with a 128 bit read instruction (EV1) and one with a 32 bit read instruction (EV2), the initial estimate bandwidth envelope EV is a proportional summation of:

$$EV=(0.5*EV1)+(0.5*EV2)$$

This approximation has been found to be appropriate for an initial measurement, i.e. the approximation is close enough. This initial bandwidth estimation in the offline mode is based on the feature detection (data transaction such as read, write, load, and/or store), information about the amount of data subjected to the data transaction (memory size buffer sizes and the like) and the predefined bandwidth envelopes stored in the memory unit 20.

In the online mode, the current bandwidth is then measured online during an ongoing data communication or data transaction. The appropriate bandwidth envelopes are computed as follows:

Find the nearest bandwidth envelopes (y1, y2) for a current bandwidth measurement;

Find the ratio (r1, r2) between the nearest bandwidth envelopes and the current bandwidth measurement;

Construct a new bandwidth envelope from the two nearest bandwidth envelopes that fulfills the identified ratio by interpolation;

Multiple measurements can be mediated over a time window that can be considered based on the dynamic behavior of the computer system 10. If for instance a significant number of application programs are present, it is possible to adapt the length of time window e.g. by narrowing, since the change in load might significantly vary due to the number of application programs which are executed simultaneously.

Figure 6:
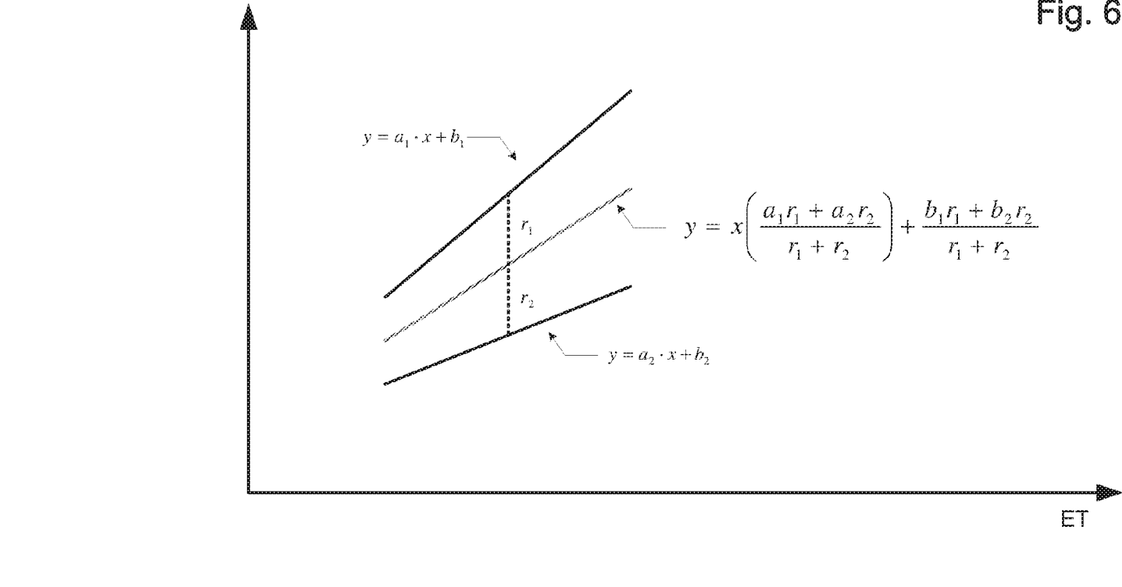
FIG. 6 shows the method of finding of a segment of a new bandwidth envelope by interpolation.

The method of finding of a segment for a new bandwidth envelope by interpolation considering the aforementioned ratio (r1, r2) is shown in FIG. 6. Here, it is understood that the new bandwidth envelopes is constructed from the segments approximating the bandwidth envelopes as shown in FIG. 5 by interpolation considering the ratio between the measured bandwidth and the nearest bandwidth envelopes.

This second or online operation mode is executed after the initial or first or offline operation mode is finished. Preferably, this second/offline operation mode is repeatedly executed; more preferably the second/offline operation mode is iteratively executed.

Hereinafter some additional embodiments or preferable variations are explained:

In case the measurements cannot be bound by two envelopes and by applying an interpolation function, it is also possible to employ an extrapolation. Once an estimation bandwidth envelope is obtained, the predicted time can then be computed by taking into account the amount of data, memory size allocated to the data and/or buffer sizes that are used in conjunction with the data transaction.

Preferably, the bandwidth measurement is synchronized with the moment a code or a kernel was sent to the programmable circuit 12 or GPU. Typically, the timing of the measurement is synchronized by a driver enabling and managing access to the programmable circuit 12, such as a hardware driver for a graphics processing unit (GPU).

Preferably, a single bandwidth envelope is approximated by several segments. The number of segments used for approximating the bandwidth envelope is selected such the bandwidth envelope is never overestimated.

If a mix of load instructions is detected in a specific kernel, a mix of corresponding bandwidth envelopes can be used for the bandwidth estimation.

The present method can lead to a convergence bandwidth envelope on a closed computer system. Alternatively, the method can also be continuously applied on open computer systems or on such computer systems which exhibit more or less variations on bus access priorities.

The invention is advantageous when being implemented in a GPU based computer architecture. However, it should be understood that the improved GPU models may be similarly applied also for bandwidth estimation of any programmable system including a central processing unit (CPU), microprocessor, a microcontroller or the like.

The method, as set out before, may for example be implemented in a computer readable program product, which contains instructions which, when executed on a computer, cause the computer to perform the method.

The programmable circuit 12 may, for example, be or comprise a microprocessor or microcontroller. Such a programmable circuit 12 may be employed in a processing device, for example a central processing unit (CPU) and/or a coprocessor and/or a digital signal processor and/or an embedded processor. The programmable circuit 12 may for instance include one, or more, processor cores which can execute the instructions in a memory connected to the processor core. The processor cores may for instance include the logic circuitry required to execute program code in the form of machine code. The processor cores may for instance at least include an instruction decoder, an arithmetic unit, an address generation unit, and a load/store unit. The programmable circuit 12 may for example include, in addition to the processor core, inputs/outputs or other components, such as and/or communication interfaces and/or coprocessors and/or analog-to-digital converters and/or clocks and reset generation units, voltage regulators, memory (such as for instance flash, EEPROM, RAM), error correction code logic and/or timers or other suitable components.

The programmable circuit 12 may, for example, be employed in a safety critical system. A safety critical system may, for example, be an automotive safety critical system, where possible malfunction or wrong usage may endanger, for example, a user of the system, e.g. a car driver. A safety critical system may, for example, be part of electronic equipment of a power plant or a self-propelled vehicle, such as a car, truck, plane, ship, helicopter, etc. An automotive safety critical system, may, for example, comprise an engine control unit (ECU). An automotive safety critical system may, for example, be a car safety system. A safety critical system may comprise a seat position control system, lighting, airbags, windscreen wipers, immobilizers, electronic climate control, a brake system or an electrical steering system. A brake system may comprise, for example, an anti-lock braking system (ABS), an electronic brake force distribution system (EBD), a cornering brake control (CBC) system etc. An electrical steering system may comprise, for example, an electronic stability control system (ESC), a traction control system (TCS) or anti-slip regulation system (ASR), an adaptive cruise control (ACC) system, a forward collision warning (FCW) system or similar system.

In the terminology of the present application, a code or a code section should be understood as a set of instructions (or a sequence of instructions), which may be directly executed by a programmable circuit or processing unit or a set of commands, which may have to be first translated or transformed (e.g. by a so-called interpreter or a so-called compiler) into instructions executable by a programmable circuit or processing unit. In particular, a code may be a part of a software or application program.

In the terminology of the present application the term kernel should be understood to refer to a part, portion, code or code section of a software or application program that is executed may times, preferably independently from each other but on different data. A kernel may be isolated into a function that is executable on the programmable circuit or processing unit as many different threads, where a thread may be understood as the smallest sequence of programmed instructions that can be managed independently.

An application programming interface (API) may be understood as a particular set of rules and specifications that programs can follow to communicate and interact with each other. It serves as an interface between different programs and facilitates their interaction. A driver, which is computer program that operates or controls a device or hardware unit that is implemented in, connected to or attached to a computer system, often provide one or more application programming interfaces (API), which allow an application program to access and make use of the functionalities of the device or hardware unit provided through the driver and the API thereof, respectively.

In the present application, the term bandwidth should be understood as referring to a ratio of the amount of data transactions to the time required for performing those data transactions; or in other words the amount of data that can be transferred between data transferring entities in a given period of time. Bandwidth sometimes also defines the net data rate, channel capacity, or the maximum throughput of a logical or physical data communication path or connection in a computer system.

The term instruction may be understood to denote an operation of a programmable circuit or processing unit within a computer system. The term command may be understood to refer to a directive to a computer program acting as an interpreter in order to perform a specific task.

An envelope function of a varying signal, such as a measurement function, is a smooth curve outlining its local extremes in amplitude. Thus, an envelope resembles the progression of the local extremes of the varying signal. In the context of bandwidth curves, exemplary bandwidth curves are shown in FIGS. 5 and 6, the bandwidth envelope should be understood to refer to the upper envelope, which resembles the progression of the local maxima. Moreover, it should be understood that the approximated bandwidth envelope as described above with reference to FIG. 5 resembles the upper envelope of the measured/measurable bandwidth curve at a predetermined range of error.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different circuitry components. For example, the exemplary topology in the figures and the discussion thereof is presented merely to provide a useful reference in discussing various aspects of the invention. Of course, the description of the topology has been simplified for purposes of discussion, and it is just one of many different types of appropriate topologies that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device.

In the claims, any reference signs placed between parentheses shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried, unless specifically recited in the claim.

Skilled artisans will appreciate that elements in the figures are illustrated for simplicity and clarity and have not necessarily drawn to scale. For example, the chosen elements are only used to help to improve the understanding of the functionality and the arrangements of these elements in various embodiments of the present invention. Also, common but well understood elements that are useful or necessary in a commercial feasible embodiment are mostly not depicted in order to facilitate a less abstracted view of these various embodiments of the present invention. It will further be appreciated that certain actions and/or steps in the described method may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of inquiry and study except where specific meanings have otherwise be set forth herein.

LIST OF REFERENCE SIGNS 10 computer system, communication system
11 code memory
12 programmable circuit
13 memory controller
14 input/output to memory
15 bandwidth estimation circuit
16 output
17 loop back connection
18 input
20 memory unit
21 bandwidth measurement unit
22 selection unit
23 calculation unit
24 detection unit
BW1 information of the estimated bandwidth
BW2 measured bandwidth
EV bandwidth envelope
EV1 bandwidth envelope
EV2 bandwidth envelope
X1 information about data transfer
X2 information provided at input 18
X3 selected bandwidth envelopes

The invention claimed is:

1. A bandwidth estimation circuit for predicting bandwidth, the bandwidth estimation circuit comprising:
   a memory unit which is configured to store multiple predetermined bandwidth envelopes, wherein each one of the predetermined bandwidth envelopes is assigned to a feature of a code of an application program;
   a bandwidth measurement unit which is configured to online measure the bandwidth of a data transaction based on the code;

a selection unit coupled either to the memory unit and the bandwidth measurement unit and configured to find the nearest bandwidth envelopes in the memory unit for the measured bandwidth; and a calculation unit which is configured to calculate a ratio between selected bandwidth envelopes and the measured bandwidth, to construct a new bandwidth envelope by applying an interpolation function based on the calculated ratio and to calculate an estimated bandwidth by applying the new bandwidth envelope.

2. The bandwidth estimation circuit of claim 1, wherein the interpolation function, at least in sections, is a linear function.

3. The bandwidth estimation circuit of claim 2, wherein the interpolation function consists of multiple interconnected linear sections.

4. The bandwidth estimation circuit of claim 1, wherein a feature refers to an instruction of a code relating to a data transaction, in particular a write instruction, read instruction, load instruction and/or store instruction.

5. The bandwidth estimation circuit of claim 1, further comprising a feature detection unit which in an offline mode is configured to analyse at least one code of an application program and to detect features in this code.

6. The bandwidth estimation circuit of claim 5, wherein in the offline mode the selection unit is further configured to select one of the bandwidth envelopes stored in the memory unit and associated to the detected feature and wherein in the offline mode the bandwidth estimation unit is configured to calculate the estimated bandwidth by applying the selected bandwidth envelope.

7. The bandwidth estimation circuit of claim 1, wherein the selection unit comprises a comparator unit which is configured to find the nearest two bandwidth envelopes by comparing a difference of the measured bandwidth with the stored envelopes and by selecting those stored bandwidth envelopes which exhibit the lowest differences.

8. The bandwidth estimation circuit of claim 1, wherein the selection unit and/or the calculation unit are part of a programmable apparatus.

9. A computer system, comprising:
a programmable circuit which is configured to run at least one application program; and
a bandwidth estimation circuit according to claim 1, which is connected to the programmable circuit via a loop back connection in order to enable the bandwidth measurement unit-to online measure the bandwidth of a data transaction when one or more application programs are executed by the programmable circuit.

10. The computer system of claim 9, wherein the programmable circuit comprises a processing unit, in particular a graphics processing unit.

11. The computer system of claim 9, wherein the programmable circuit comprises a memory controller arranged downstream the central processing unit.

12. A method for estimating and predicting bandwidth, comprising:
a first operation mode of a bandwidth estimation circuit where the bandwidth is estimated offline by analyzing an application program, detecting features therein and estimating the bandwidth by using predetermined bandwidth envelopes for each one of the detected features; and
a second operation mode of the bandwidth estimation circuit where the bandwidth is estimated online based on measuring the bandwidth of a data transaction, providing an interpolating function which fits best to the measured bandwidth and calculating the bandwidth using the interpolation function.

13. The method of claim 12, wherein the first operation mode is executed before the second operation mode is started.

14. The method of claim 12, wherein the second operation mode is repeatedly, in particular iteratively, executed.

15. The method of claim 12, further comprising a third operation mode where bandwidth envelopes are calculated for different features of the codes by approximating the measured bandwidth curves wherein the approximated bandwidth envelopes are stored in a memory unit.

16. The method of claim 12, wherein the bandwidth envelopes are approximated and stored in the form of several subsequent segments, wherein each of the segments is a linear function.

* * * * *